(12) United States Patent
Park et al.

(10) Patent No.: US 11,409,642 B2
(45) Date of Patent: Aug. 9, 2022

(54) AUTOMATIC PARAMETER VALUE RESOLUTION FOR API EVALUATION

(71) Applicant: FUJITSU LIMITED, Kawasaki (JP)

(72) Inventors: Junhee Park, San Jose, CA (US);
Athar Sefid, City College, PA (US);
Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 16/741,694

(22) Filed: Jan. 13, 2020

(65) Prior Publication Data
US 2021/0216443 A1 Jul. 15, 2021

(51) Int. Cl.
*G06F 11/36* (2006.01)
*G06N 20/00* (2019.01)
*G06F 9/54* (2006.01)

(52) U.S. Cl.
CPC ........... *G06F 11/3688* (2013.01); *G06F 9/54* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,816,848 B1 * | 11/2004 | Hildreth | G06F 16/284 706/45 |
| 9,104,525 B2 | 8/2015 | Dang et al. | |
| 10,133,650 B1 | 11/2018 | Park et al. | |
| 10,552,735 B1 * | 2/2020 | Widerhorn | G06N 3/08 |
| 10,656,973 B2 | 5/2020 | Park et al. | |

(Continued)

FOREIGN PATENT DOCUMENTS

WO WO-2020141097 A1 * 7/2020 ............. G16H 20/00

OTHER PUBLICATIONS

H. Ed-douibi, J. L. Cánovas Izquierdo and J. Cabot, "Automatic Generation of Test Cases for REST APIs: A Specification-Based Approach," 2018 IEEE 22nd International Enterprise Distributed Object Computing Conference (EDOC), 2018, pp. 181-190, doi: 10.1109/EDOC.2018.00031. (Year: 2018).*

J. Härtel, H. Aksu and R. Lämmel, "Classification of APIs by Hierarchical Clustering," 2018 IEEE/ACM 26th International Conference on Program Comprehension (ICPC), 2018, pp. 233-23310. (Year: 2018).*

(Continued)

*Primary Examiner* — Andrew M. Lyons
(74) *Attorney, Agent, or Firm* — Fujitsu Patent Center

(57) ABSTRACT

A method for parameter value resolution, includes extracting, from an application programming interface (API) repository, metadata information associated with an API parameter set of at least one API and generating parameter clusters associated with the API parameter set based on the extracted metadata information. Each parameter cluster may include word tokens associated with at least one API parameter of the API parameters set. The method furthers includes determining a representative term for each parameter cluster and based on the determined representative term, extracting sample parameter values from a knowledge base server. The method further includes generating test API endpoints associated with the at least one API based on the extracted sample parameter values, validating the extracted sample parameter values by executing the generated test API endpoints, and publishing, based on the validation, validation result as an indicator for suitability of the at least one API for a software application.

19 Claims, 8 Drawing Sheets

(56) References Cited

U.S. PATENT DOCUMENTS

| | | | |
|---|---|---|---|
| 2011/0219012 A1* | 9/2011 | Yih | G06N 20/00 |
| | | | 707/749 |
| 2016/0189204 A1* | 6/2016 | Ma | G06Q 30/0201 |
| | | | 705/14.43 |
| 2016/0352778 A1* | 12/2016 | Chari | H04L 63/20 |
| 2017/0116114 A1* | 4/2017 | Tosar | G06F 11/3684 |
| 2017/0308640 A1* | 10/2017 | Brelje | G06F 30/15 |
| 2018/0144251 A1* | 5/2018 | Chou | G06N 5/02 |
| 2018/0225710 A1* | 8/2018 | Kar | G06Q 30/0201 |
| 2019/0332523 A1* | 10/2019 | Gefen | G06N 7/005 |
| 2020/0053591 A1* | 2/2020 | Prasad | G06N 3/0445 |
| 2020/0065160 A1* | 2/2020 | Park | G06N 20/00 |
| 2021/0141863 A1* | 5/2021 | Wu | G06N 3/08 |

OTHER PUBLICATIONS

Extended European Search Report (EESR) dated Mar. 3, 2021, by the European Patent Office in counterpart application EP20195965. 7, 8 pages, please note that U.S. Pat. No. 10,133,650, an "X" reference cited in this EESR has been previously cited by Applicant in the instant application.

Sid Lamrous, et al., "Divisive Hierarchical K-Means", Computational Intelligence for Modeling, Control and Automation, International Conference on Intelligent Agents, Web Technologies and Internet Commerce, (CIMCA-IAWTIC'06) IEEE, 2006, 6 pages.

Lee, Y.-J. (2015) Semantic-Based Web API Composition for Data Mashups. Journal of Information Science and Engineering. 31. 1233-1248.

* cited by examiner

AUTOMATIC PARAMETER VALUE RESOLUTION FOR API EVALUATION

FIELD

The embodiments discussed in the present disclosure are related to automatic parameter value resolution for evaluation of application programming interfaces (APIs).

BACKGROUND

Many individuals, companies, and organizations offer APIs to third party developers and/or third party organizations for several applications, such as speech processing, text processing, and social media analysis. Typically, APIs are programmatic interfaces with publicly exposed API endpoints that may specify where resources can be accessed by a third party software. Third party developers may require inclusion of a specific programming code to call a particular API from an application code so as to integrate the functionally offered by the particular API.

As many companies have realized that there may be significant growth opportunities associated with running a platform to offer APIs to software developers, there has been a proliferation in the number of APIs available over the past years. Due to this rapidly growing number of APIs, software developers today have a large number API choices for their application. Therefore, evaluation of every API choice before incorporating into the application become both crucial task and overwhelming for the software developers.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include extracting, from an application programming interface (API) repository, metadata information associated with an API parameter set of at least one API and generating a set of parameter clusters associated with the API parameter set based on the extracted metadata information. Each parameter cluster of the set of parameter clusters may include a group of word tokens associated with at least one API parameter of the API parameters set. The operations may further include determining a representative term for each parameter cluster of the generated set of parameter clusters and extracting, from a knowledge base server, a set of sample parameter values based on the determined representative term. The operations may further include generating a set of test API endpoints associated with the at least one API based on the extracted set of sample parameter values, validating the extracted set of sample parameter values by executing the generated set of test API endpoints, and publishing, based on the validation, a validation result as an indicator for suitability of the at least one API for a software application.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
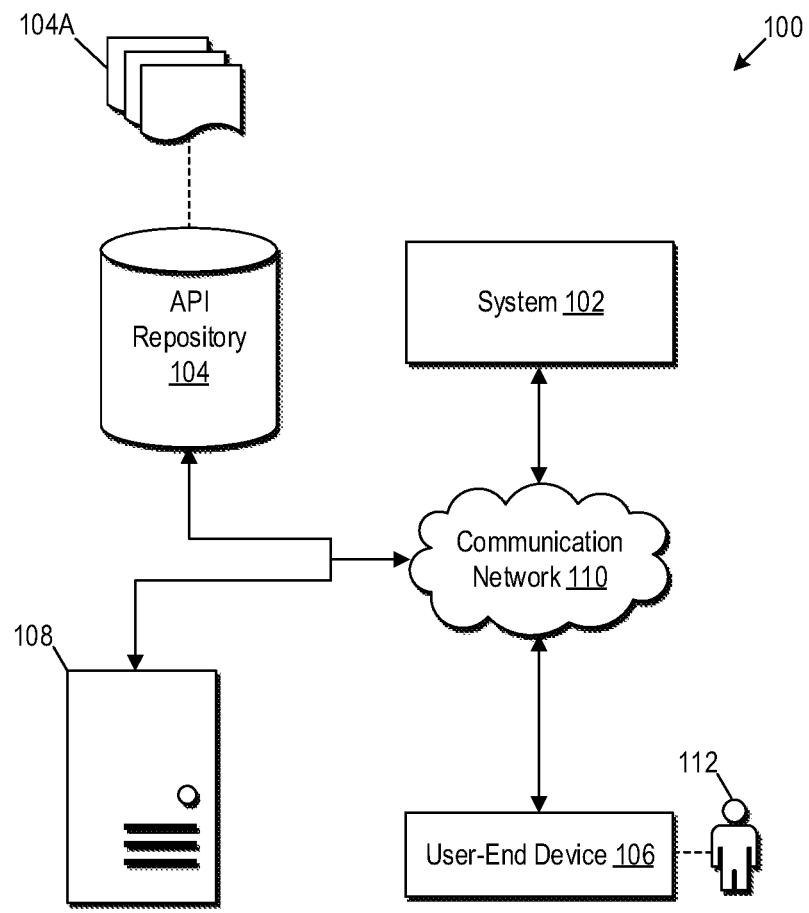
FIG. 1 is a diagram representing an example environment for sample value resolution for Application Programming Interface (API) evaluation.

Some embodiments described in the present disclosure relate to a method and a non-transitory computer-readable medium for parameter value resolution for evaluation of application programming interfaces (APIs). APIs have become a fundamental building block for companies to develop and integrate software for their products. However, rapid growth in number of APIs have created significant challenges for software engineers as they have to evaluate a large number of APIs to find the one that is most desirable for their purpose. While major API providers tend to offer limited number of default values for API parameters, majority of API evaluation still relies on potential users to manually provide sample values in order for them to try out; thus, creating significant overheads for software developers. The present disclosure provides an automatic parameter resolution and API testing platform that performs operations, such as:

1. Processes parameter descriptions and extracts features,
2. Utilizes clustering algorithm (e.g., k-means) to classify each parameter into a specific group,
3. Exploits cluster representatives to build a linkage between external data sources (e.g. public data sources, such as Wikidata),
4. Extracts potential sample value candidates for API parameters,
5. Conducts API testing and response validation on extracted sample values,
6. Performs intra-cluster parameter resolution to provide sample values for parameters for which sample values were indeterminate/not available.

According to one or more embodiments of the present disclosure, the technological field of web/software application development may be improved by configuring a computing system to offer a platform for automatic parameter resolution and API testing/evaluation. Such a platform may:

1. Automatically find sample parameter values for API endpoints,

2. Automatically validate the sample parameter values by testing the API endpoints using the sample parameter values, and
3. Publish a validation results as an indication of the suitability of the API/API endpoints for use in a software application.

The validation result may allow a user, such as a software developer, to evaluate APIs (and/or individual API endpoints). This platform may also help the user to save time in formulation of parameter values for evaluation of the APIs/API endpoints to evaluate whether the API should be used in development of the software application. Also, to validate the sample parameter values, the platform may use optimal methods to shuffle test API endpoints while testing individual test scenario, and thereby may reduce a time complexity of trying out possible combinations of sample parameter values.

The ability to evaluate one or more APIs/API endpoints based on computer-generated sample parameter values may provide a number of benefits to the operation of the computer itself, and improvements to the related field of computer programming. With respect to the computer itself, the use of the parameter clustering and extraction of the sample parameter values from a knowledge base server based on representative terms associated with the parameter clusters, may provide the computer with improved functionality. The improvement in functionality may be provided by allowing the computer to invoke and/or implement new functionality that has not existed before, and to generate such functionality in an automated manner. For example, the present disclosure may facilitate generation of validation results for evaluation of APIs/API endpoints to enable a user, such as a developer, to incorporate the functionality of an appropriate API and endpoint in desired software applications.

With respect to improving computer programming, the present disclosure may provide enhanced capabilities for software development. For example, the present disclosure may provide relevant indication through the validation result for the sample parameter values generated for at least one API. This may further enable software developers to assess a suitability of APIs for use in a software application.

Embodiments of the present disclosure are explained with reference to the accompanying drawings.

FIG. 1 is a diagram representing an example environment for sample value resolution for Application Programming Interface (API) evaluation, arranged in accordance with at least one embodiment described in the present disclosure. With reference to FIG. 1, there is shown an environment 100. The environment 100 may include a system 102, an API repository 104, a user-end device 106, a knowledge base server 108, and a communication network 110. There is further shown a set of documents (hereinafter, referred to as a documentation corpus 104A) associated with a set of APIs and stored in the API repository 104. There is further shown a user 112 who may be associated with the system 102 and/or the user-end device 106. Herein, the user 112 may be an individual, a team of individuals, or an organization associated with software development, debugging, or software testing functions.

The system 102 may include suitable logic, circuitry, and interfaces that may be configured to perform operations related to generation of sample parameter values API parameters associated with API endpoints so as to test the API endpoints based on the sample parameter values and to validate the API endpoints and/or the sample parameter values. Examples of the system 102 may include, but are not limited to, an integrated development environment (IDE) device, a software testing device, a mobile device, a desktop computer, a laptop, a computer work-station, a computing device, a mainframe machine, a server, such as a cloud server, and a group of servers. In one or more embodiments, the system 102 may include a user-end terminal device and a server communicatively coupled to the user-end terminal device. Examples of the user-end terminal device may include, but are not limited to, a mobile device, a desktop computer, a laptop, and a computer work-station. The system 102 may be implemented using hardware including a processor, a microprocessor (e.g., to perform or control performance of one or more operations), a field-programmable gate array (FPGA), or an application-specific integrated circuit (ASIC). In some instances, the system 102 may be implemented using a combination of hardware and software.

In at least one embodiment, the system 102 may extract the documentation corpus 104A associated with a set of APIs. The documentation corpus 104A may be available as publicly available information and/or may be part of the API repository 104. The documentation corpus 104A may include a plurality of structured or unstructured API specification documents associated with the set of APIs. Each API specification document may include information mapped to fields, such as API title, endpoint name(s), endpoint description(s), input/output parameters, primary categories, secondary categories, and tags associated with a corresponding API of the set of APIs.

By way of example, and not limitation, the system 102 may deploy a web crawler or a web scraper (e.g. a crawler bot or a scraper bot) on one or more computer-based sources on the web to look up for and collect the publicly available information associated with the set of APIs. Such publicly available information may include API specification documents associated with the set of APIs. Additionally, or alternatively, the system 102 may search the API repository 104 to look up and collect API specification documents associated with set of APIs. These API specification documents may collectively form the documentation corpus 104A.

By way of example, the API repository 104 may include suitable logic, interfaces, and/or code that may be configured to store the documentation corpus 104A associated with the set of APIs. In some cases, the API repository 104 may be implemented on a server, such as a web server or a cloud server, from where the documentation corpus 104A may be cached and stored on the system 102. Additionally, or alternatively, the API repository 104 may be implemented using hardware, including but not limited to, a processor, a microprocessor (e.g., to perform or control performance of one or more database operations), a field-programmable gate array (FPGA), or an application-specific integrated circuit (ASIC).

From the documentation corpus 104A, the system 102 may extract metadata information associated with an API parameter set of one or more APIs. The API parameter set may include API parameters, which may be required to be passed along with an API call to an API provider. In at least one embodiment, the system 102 may perform a textual analysis of the documentation corpus 104A associated with the set of APIs. Based on the textual analysis of the documentation corpus 104A, the system 102 may generate an OpenAPI (OAS) specification) for the set of APIs. An example of the OAS specification and example metadata information is provided in FIG. 4.

By way of example, the metadata information may be extracted by scraping documents, such as OpenAPI (OAS)

specifications, API web pages, or API mashup documents, in the documentation corpus 104A. The metadata information may include, for example, an API title, an API host address, an API base path, an API endpoint, an HTTP method, an API parameter type, an API parameter description, and the like. Thereafter, from the extracted metadata information, a training dataset and a live dataset may be constructed. While the training dataset may be used to train a set of machine learning classifier models for parameter type classification, the live dataset may be used for the parameter type classification. The result of the parameter type classification may be used later to filter sample parameter values which are extracted from the knowledge base server 108. Operations to train the set of machine learning classifier models and to perform the parameter type classification are provided in detail, for example, in FIG. 5.

Based on the extracted metadata information, the system 102 may generate a set of parameter clusters associated with the API parameter set. Each parameter cluster of the set of parameter clusters may include a group of word tokens associated with one or more API parameters of the API parameters set. Operations related to generation of the set of parameter clusters are provided in detail, for example, in FIG. 6. The system 102 may determine a representative term for each parameter cluster of the generated set of parameter clusters. For example, the representative term may be determined based on a frequency-based approach, whereby common terms may be determined between top-N centroids of every parameter cluster and bi-grams that occur in parameter description associated API parameters of the respective parameter cluster.

For each parameter cluster, based on the determined representative term, the system 102 may extract a set of sample parameter values from the knowledge base server 108. By way of example, and not limitation, a search query that includes the determined representative term may be issued to the knowledge base server 108. Based on the search query, the knowledge base server 108 may perform a search within its own databases to output a plurality of sample parameter values. In at least one embodiment, the plurality of sample parameter values may include noisy parameter values which may be invalid or may not be required later for API validation. A filter may need to be applied on the plurality of the sample parameter values and therefore, results (e.g., parameter type information) obtained after performing the parameter type classification on the live dataset may relied upon to filter the plurality of sample parameter values. Thus, based on the results (e.g., parameter type information), the system 102 may extract the set of sample parameter values from the plurality of sample parameter values. Based on the extracted set of sample parameter values, the system 102 may generate a set of test API endpoints associated with one or more APIs. Each test API endpoint may represent a test scenario and may be configured with at least one sample parameter value of the set of sample parameter values.

The system 102 may validate the extracted set of sample parameter values by executing the generated set of test API endpoints as a sequence of API calls to the API provider. Finally, based on the validation, the system 102 may publish a validation result as an indicator for suitability of the one or more APIs for a software application. The validation result may include, for example, the validated set of parameter values and/or the output obtained based on the execution of the test API endpoints. The validation result may be published, for example, on a display of the user-end device 106 accessible to the user 112. In at least one embodiment, the user 112 may provide user inputs via the user-end device 106 to specify the one or more APIs/endpoints which need to be validated and/or API parameters for which sample parameter values may need to be determined and validated.

By way of example, the user-end device 106 may include one or more of an integrated development environment (IDE), a code editor, a software debugger, software development kit, or a testing application. Examples of the user-end device 106 may include, but are not limited to, a mobile device, a desktop computer, a laptop, a computer workstation, a computing device, a mainframe machine, a server, such as a cloud server, and a group of servers. Although in FIG. 1, the user-end device 106 is shown to be separated from the system 102; however, in some embodiments, the user-end device 106 may be integrated with system 102, without a deviation from the scope of the disclosure.

The system 102, the API repository 104, the user-end device 106, and the knowledge base server 108 may be communicatively coupled to each other, via the communication network 110. The communication network 110 may include a communication medium through which the system 102 may communicate with the API repository 104, the user-end device 106, and the knowledge base server 108. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1, without departing from the scope of the present disclosure. For example, the environment 100 may include more or fewer elements than those illustrated and described in the present disclosure. For instance, in some embodiments, the environment 100 may include the system 102 but not the API repository 104 and the user-end device 106. In addition, in some embodiments, the functionality of each of the API repository 104, the user-end device 106, and/or the knowledge base server 108 may be incorporated into the system 102, without a deviation from the scope of the disclosure.

Figure 2:
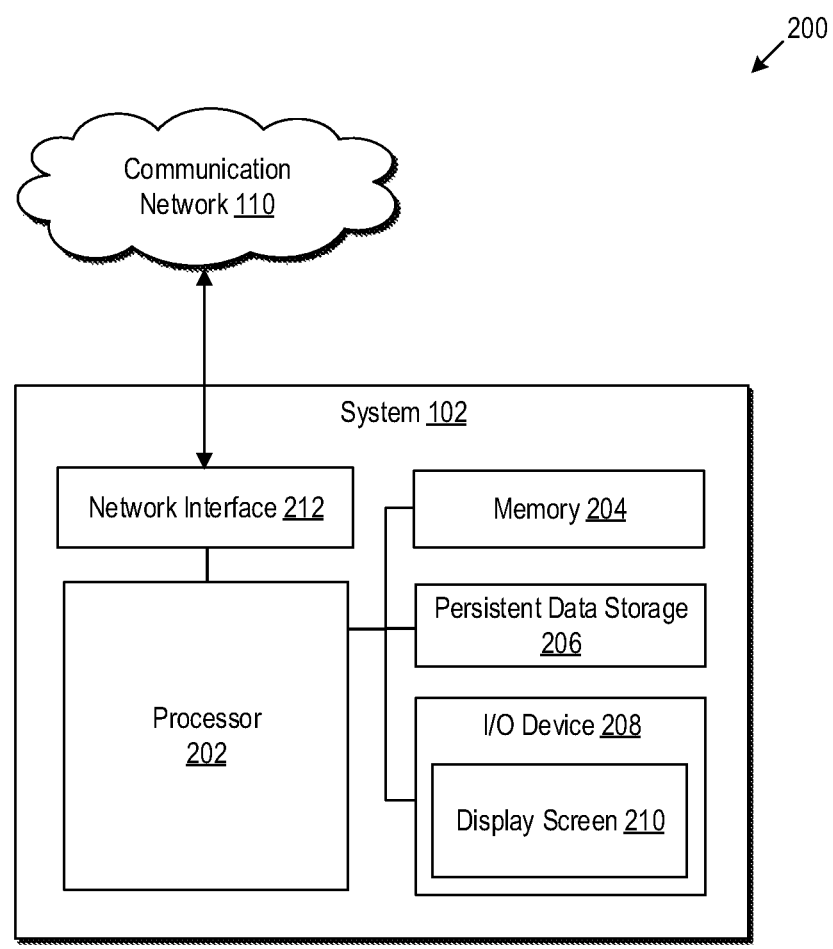
FIG. 2 is a block diagram of an example system for sample value resolution for API evaluation.

FIG. 2 is a block diagram of an example system for sample value resolution for API evaluation, arranged in accordance with at least one embodiment described in the present disclosure. FIG. 2 is explained in conjunction with elements from FIG. 1. With reference to FIG. 2, there is shown a block diagram 200 of the system 102. The system 102 may include a processor 202, a memory 204, a persistent data storage 206, an input/output (I/O) device 208, a display screen 210, and a network interface 212.

The processor 202 may include suitable logic, circuitry, and/or interfaces that may be configured to execute program instructions associated with different operations to be executed by the system 102. The processor 202 may include any suitable special-purpose or general-purpose computer, computing entity, or processing device including various computer hardware or software modules and may be configured to execute instructions stored on any applicable computer-readable storage media. For example, the processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 202 may include any number of processors configured to, individually or collectively, perform or direct performance of any number of operations of the system 102, as described in the present disclosure. Additionally, one or more of the processors may be present on one or more different electronic devices, such as different servers. In some embodiments, the processor 202 may be configured to interpret and/or execute program instructions and/or process data stored in the memory 204 and/or the persistent data storage 206. In some embodiments, the processor 202 may fetch program instructions from the persistent data storage 206 and load the program instructions in the memory 204. After the program instructions are loaded into the memory 204, the processor 202 may execute the program instructions. Some of the examples of the processor 202 may be a GPU, a CPU, a RISC processor, an ASIC processor, a CISC processor, a co-processor, and/or a combination thereof.

The memory 204 may include suitable logic, circuitry, interfaces, and/or code that may be configured to store program instructions executable by the processor 202. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or a special-purpose computer, such as the processor 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The persistent data storage 206 may include suitable logic, circuitry, interfaces, and/or code that may be configured to store program instructions executable by the processor 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or a special-purpose computer, such as the processor 202.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 202 to perform a certain operation or group of operations associated with the system 102.

The I/O device 208 may include suitable logic, circuitry, interfaces, and/or code that may be configured to receive a user input (for example, the user input associated with a user-selection of the set of selectable-tools linked to the software package). The I/O device 208 may be further configured to provide an output in response to the user input. The I/O device 208 may include various input and output devices, which may be configured to communicate with the processor 202 and other components, such as the network interface 212. Examples of the input devices may include, but are not limited to, a touch screen, a keyboard, a mouse, a joystick, and/or a microphone. Examples of the output devices may include, but are not limited to, a display and a speaker.

The display screen 210 may include suitable logic, circuitry, interfaces, and/or code that may be configured to render the generated electronic UI to the user 112. The display screen 210 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 212 may include suitable logic, circuitry, interfaces, and/or code that may be configured to establish a communication between the system 102, the API repository 104, and the user-end device 106, via the communication network 110. The network interface 212 may be implemented by use of various known technologies to support wired or wireless communication of the system 102 via the communication network 110. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX. An example workflow for creation of the object-oriented software platform has been explained, for example, in FIG. 3.

Modifications, additions, or omissions may be made to the system 102 without departing from the scope of the present disclosure. For example, in some embodiments, the system 102 may include any number of other components that may not be explicitly illustrated or described for the sake of brevity.

Figure 3:
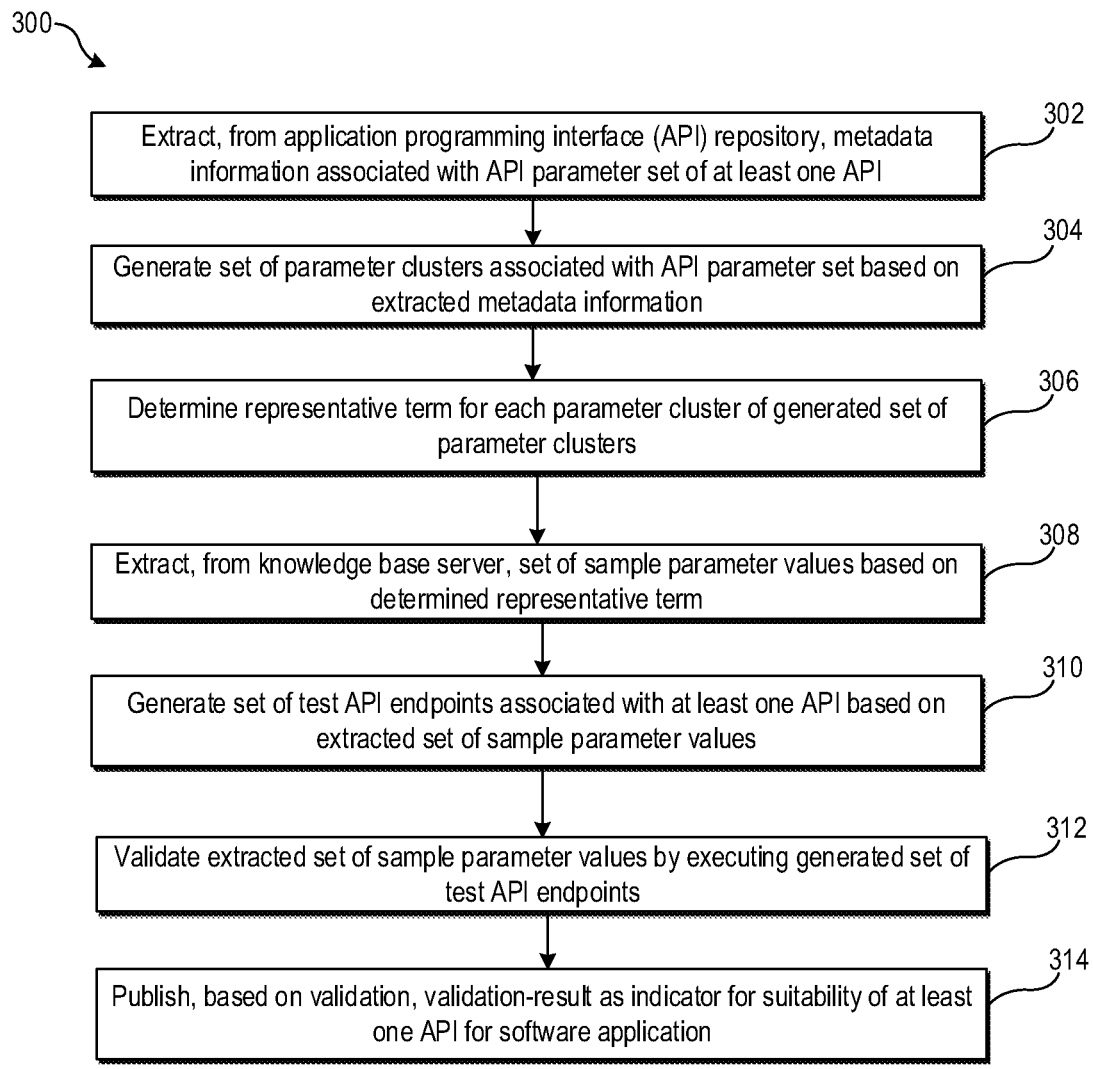
FIG. 3 illustrates a flowchart of an example method of sample value resolution for API evaluation.

FIG. 3 illustrates a flowchart of an example method of sample value resolution for API evaluation, arranged in accordance with at least one embodiment described in the present disclosure. FIG. 3 is explained in conjunction with elements from FIG. 1 and FIG. 2. With reference to FIG. 3, there is shown a flowchart 300. The method illustrated in the flowchart 300 may start at 302 and may be performed by any suitable system, apparatus, or device, such as by the system 102 of FIG. 1 or FIG. 2. Although illustrated with discrete blocks, the steps and operations associated with one or more of the blocks of the flowchart 300 may be divided into additional blocks, combined into fewer blocks, or eliminated, depending on the particular implementation.

At 302, metadata information associated with an API parameter set of one or more APIs may be extracted from the API repository 104. In at least one embodiment, the processor 202 may extract, from the API repository 104, the metadata information associated with the API parameter set of the one or more APIs. The API repository 104 may include the documentation corpus 104A associated with a set of APIs. To extract the metadata information, the processor 202 may perform a textual analysis of every document associated with the one or more APIs and present in the documentation corpus 104A. The documentation corpus 104A may include, for example, developer manuals, OAS API specifications, API documentations, tutorials, code repositories (e.g., GitHub repositories), and the like. The processor 202 may apply one or more API learning methods to perform the textual analysis and extract the metadata information associated with the one or more APIs. Such an analysis may be, for example, based on natural language processing (NLP) methods which may rely on machine learning algorithms and/or trained neural network models to understand complex semantic structure of every document (such as OAS specification document) and identify patterns that point to relevant information in the document.

By way of example, to extract the metadata information, the processor 202 may analyze various tags and categories associated with the API parameter set in documents stored in the API repository 104. Examples of the metadata information may include, but is not limited to, an API title, an API host address, an API base path, an API endpoint, an HTTP method associated with an API, an API parameter type (such as, path, query, header, and body parameter types), and an API parameter description. An example of metadata information and OAS specification associated with the metadata information is provided in FIG. 4.

In at least one embodiment, once the metadata information is extracted, a training dataset may be constructed by annotating its type from the metadata information associated with the API parameter set of the one or more APIs. The training dataset may be used to train one or more machine learning classifiers for parameter type classification, i.e., a classification of each API parameter in the API parameter set into one of two or more class labels. For example, if an API parameter is classified as a User ID type parameter by a pretrained machine learning classifier model, it may indicate that sample values for the API parameter cannot be automatically resolved and may be obtained with human intervention or human input. Herein, incoming API parameter dataset may be received from a user, such as, a developer, who may specify one or more APIs or a set of API endpoints to be automatically resolved for sample parameter values. Once the trained machine learning classifier models are obtained, results of the parameter type classification on the incoming API parameter dataset may be later used to refine or filter sample parameter values obtained for the API parameter set. Operations associated with the parameter type classification are provided in detail, for example, in FIG. 5 and FIG. 7.

At 304, a set of parameter clusters associated with the API parameter set may be generated based on the extracted metadata information. Each parameter cluster of the set of parameter clusters may include a group of word tokens associated with the one or more API parameters of the API parameters set. By way of example, to generate the set of parameter clusters, the processor 202 may execute a pre-processing operation on the metadata information, a vectorization operation on the pre-processed metadata information, a dimension reduction operation on the output of the vectorization operation to generate a dimensionally reduced dataset, and a cluster generation operation on the dimensionally reduced dataset. Operations related to generation of the set of parameter clusters are explained in detail, for example, in FIG. 6.

At 306, a representative term may be determined for each parameter cluster of the generated set of parameter clusters. In at least one embodiment, the processor 202 may determine the representative term for each parameter cluster of the generated set of parameter clusters. By way of example, for each parameter cluster, the representative term may be determined from centroid(s) of the respective parameter cluster. Once determined, the representative term may be used to establish a link to the knowledge base server 108 which may be associated with, for example, an external public data source (such as the WikiData). After establishing the link, the representation term may be used to query for sample parameter values from a matching entity in the knowledge base server 108. Operations related to the determination of the representative term and querying the knowledge base server 108 using the representative term are provided in detail, for example. in FIG. 7.

At 308, a set of sample parameter values may be extracted from the knowledge base server 108 based on the determined representative term. In at least one embodiment, the processor 202 may extract the set of sample parameter values from the knowledge base server 108 based on the determined representative term. For example, for every parameter cluster, the processor 202 may create a query using the respective representative term and may provide the created query to the knowledge base server 108. The knowledge base server 108 may provide a matching entity (e.g., an ID for the representative term) based on the provided query. The processor 202 may extract results from the knowledge base server 108 associated with the matching entity. Such results may include a plurality of sample parameter values for API parameter(s) associated with the respective parameter cluster. In at least one embodiment, the processor 202 may extract the set of sample parameter values by filtering the results extracted based on the query by use of the API parameter types (e.g., results of the parameter type classification of FIG. 5). The querying of the knowledge base server 108 is explained in detail, for example, in FIG. 7.

At 310, a set of test API endpoints associated with the one or more APIs may be generated based on the extracted set of sample parameter values. In at least one embodiment, the processor 202 may generate the set of test API endpoints based on the extracted set of sample parameter values. For example, for every parameter cluster, a set of sample parameter values may be extracted. Using the set of sample parameter values, a set of test API endpoints may be generated as unique API call scenarios for one or more API endpoints of the one or more APIs. The generation of the set of test API endpoints is explained in detail, for example, in FIG. 8.

At 312, the extracted set of sample parameter values may be validated by executing the generated set of test API endpoints. In at least one embodiment, the processor 202 may validate the extracted set of sample parameter values by executing the generated set of test API endpoints. For example, the execution of each test API endpoint may include invoking a unique API call to the API provider. Herein, the API provider may be a server or a service on a server cluster that responds to requests/API call(s) associated with the one or more APIs for which the set of test API endpoints are generated. With the execution, if a valid output is returned by the API provider for the API call, the respective sample parameter value may be determined to be valid. The validation of the set of sample parameter values is explained further, for example, in FIG. 8.

At 314, based on the validation of the extracted set of sample parameter values, a validation result may be published as an indicator for suitability of the one or more APIs or associated API endpoints for a software application. In at least one embodiment, the processor 202 may publish the validation result based on the validation of the extracted set of sample parameters values. For example, the validation result may include the validated set of sample parameter values and outputs returned by the API provider based on the execution of the set of test API endpoints. The validation result may be published on the user-end device 106 and may facilitate a software developer or an admin to decide whether the one or more APIs or associated API endpoints would work reliably when the one or more APIs or the associated API endpoints are included in the software application. Details on the validation result are further provided, for example, in FIG. 8.

Although the flowchart 300 is illustrated as discrete operations, such as 302, 304, 306, 308, 310, 312, and 314, however, in certain embodiments, such discrete operations may be further divided into additional operations, combined into fewer operations, or eliminated, depending on the particular implementation without detracting from the essence of the disclosed embodiments.

Figure 4:
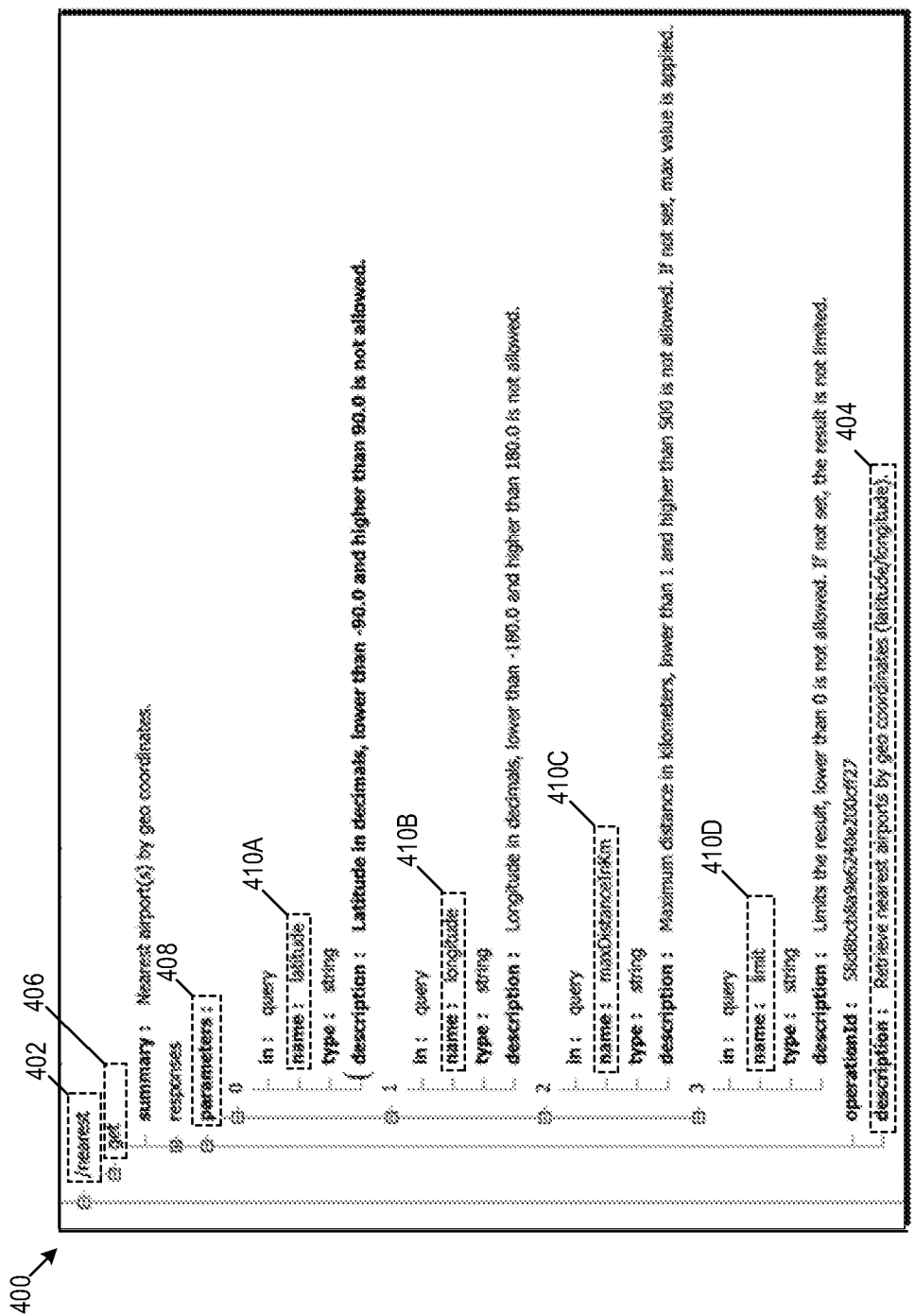
FIG. 4 illustrates an example API specification document of an API repository.

FIG. 4 illustrates an example API specification document of an API repository, in accordance with at least one embodiment described in the present disclosure. FIG. 4 is explained in conjunction with elements from FIG. 1, FIG. 2, and FIG. 3. With reference to FIG. 4, there is shown a portion of an Open API specification 400 for a RESTful API.

The Open API specification 400 may include a portion of information related to a RESTful API for geo-location application and may include one or more tags and/or categories. As shown, the Open API specification 400 includes an endpoint 402 as "/nearest" and an endpoint description 404 associated with the endpoint name as "Retrieve nearest airports by geo coordinates (latitude/longitude)". The Open API specification 400 further includes a "GET" method 406 and a parameter tag 408 associated with the "GET" method 406 of the endpoint 402. Enclosed within the parameter tag 408, information associated with a set of API parameters for the "GET" method 406 of the endpoint 402 is included. As an example, FIG. 4 shows four 'query' type parameters, i.e., a first parameter 410A named 'latitude', a second parameter 410B named 'longitude', a third parameter 410C named 'maxDistanceInKm', and a fourth parameter 410D as 'limit'.

Each API parameter is associated with the respective parameter description and parameter type associated with the respective API parameter. Here, each of the first parameter 410A, the second parameter 410B, the third parameter 410C, and the fourth parameter 410D is of a 'string' type. The parameter description for the first parameter 410A includes "Latitude in decimals, lower than −90.0 and higher than 90.0 is not allowed". The parameter description for the second parameter 410B includes "Longitude in decimals, lower than −180.0 and higher than 180.0 is not allowed". The parameter description for the third parameter 410C includes "Maximum distance in kilometers, lower than 1 and higher than 500 is not allowed. If not set, max value is applied". The parameter description for the fourth parameter 410D includes "Limits the result, lower than 0 is not allowed. If not set, the result is not limited".

Herein, the endpoint 402, the endpoint description 404, the "GET" method 406, the parameter tag 408, the first parameter 410A, the second parameter 410B, the third parameter 410C, and the fourth parameter 410D, and the respective parameter descriptions may collectively form metadata information of the RESTful API in the Open API specification 400.

It should be noted that the portion of the Open API specification 400 shown in FIG. 4 is presented merely as an example and should not be construed as limiting the present disclosure. The present disclosure may include other information related to the RESTful API which may be considered as part of the metadata information, without a deviation from the scope of the present disclosure.

Figure 5:
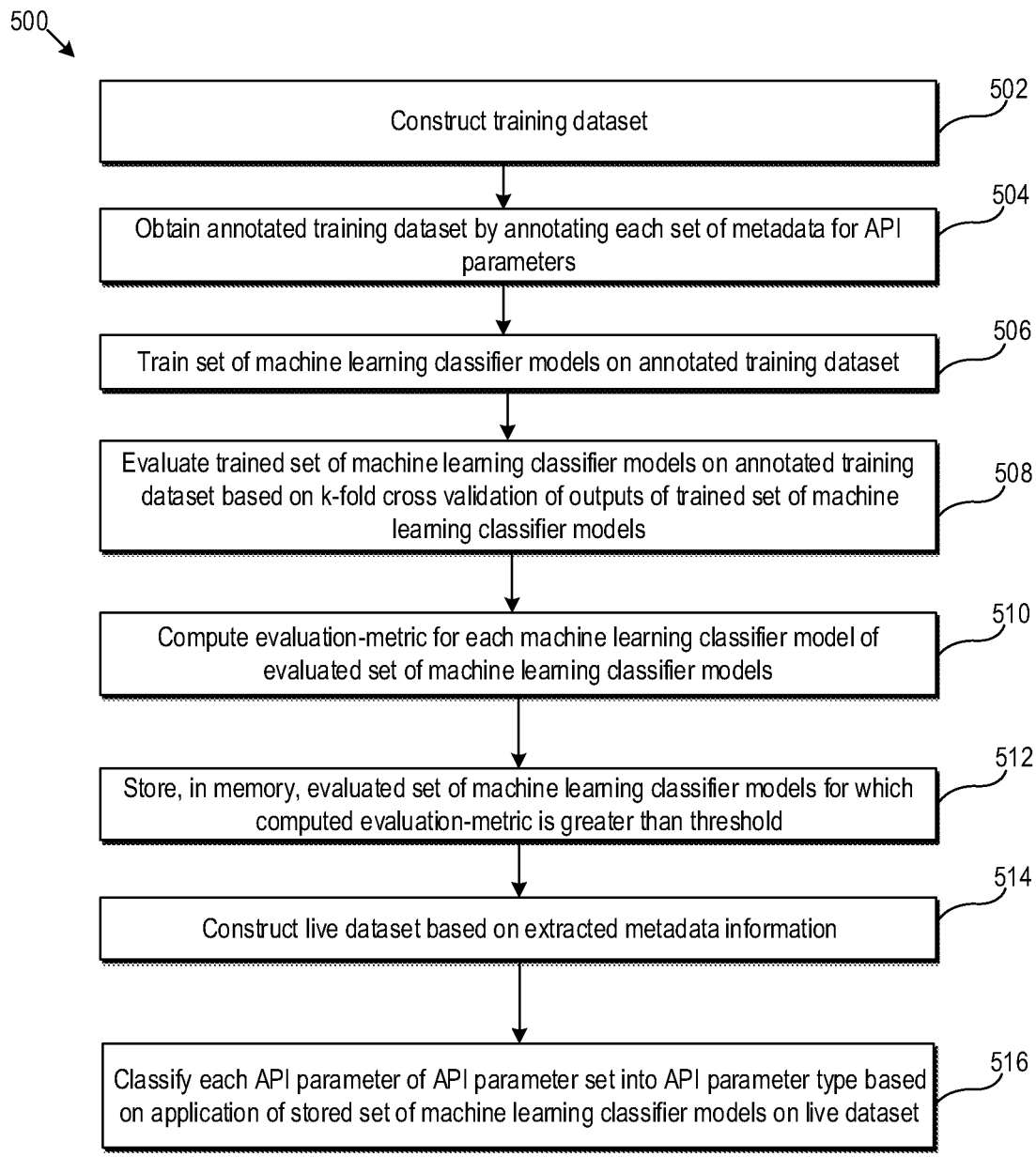
FIG. 5 illustrates a flowchart of an example method of parameter type classification.

FIG. 5 illustrates a flowchart of an example method of parameter type classification, arranged in accordance with at least one embodiment described in the present disclosure. With reference to FIG. 5, there is shown a flowchart 500. The method illustrated in the flowchart 500 may start at 502 and may be performed by any suitable system, apparatus, or device, such as by the system 102 of FIG. 1 or FIG. 2. Although illustrated with discrete blocks, the steps and operations associated with one or more of the blocks of the flowchart 500 may be divided into additional blocks, combined into fewer blocks, or eliminated, depending on the particular implementation.

It should be noted that operations from 502 to 512 may be performed before a live usage case, where developers can specify APIs or API endpoints for which sample parameter values may need to be resolved. Operations from 514 and onwards are associated with the live usage case.

At 502, a training dataset may be constructed. The training dataset may include sets of metadata associated a set of API parameters. Such sets of metadata may be extracted for a training task from multiple API repositories associated with a large number (e.g., >100) of APIs. In at least one embodiment, the processor 202 may construct the training dataset. For example, the training dataset may include the sets of metadata as word/sentence tokens which may be extracted from API parameter name(s) and description text available in documents stored in the API repositories.

At 504, an annotated training dataset may be obtained by annotating a plurality set of metadata for API parameters. The annotation may be performed based on API parameter metadata, such as name, description and its data type. For example, "userID Gmail User ID String" may be annotated as ID class. In at least one embodiment, the processor 202 may obtain an annotated training dataset by annotating each set of metadata. For example, each set of metadata may include word tokens, sentence tokens, or n-grams, as part of parameter name(s) and description text associated with the set of API parameters. The annotated training dataset may be later used to train classifier models, as described herein.

At 506, a set of machine learning classifier models may be trained on the annotated training dataset. In at least one embodiment, the processor 202 may train the set of machine learning classifier models on the annotated training dataset. The set of machine learning classifier models may be trained on the annotated training dataset to classify individual API parameters into an API parameter class. By way of example, and not limitation, the set of machine learning classifier models may include three separate classifiers, i.e. Naïve Bayes classification classifier, a Support Vector Machine (SVM) classifier, and a Logistic Regression (LR) classifier. Though an example of only three machine learning classifier models is mentioned herein, the scope of the disclosure may not be limited to the disclosed machine learning classifier model examples. In certain instances, more than one type of machine learning classifier models may be trained on the annotated training dataset. This may be performed to develop agreement-based classification of API parameters into individual API parameter types. In agreement-based classification, a classification result that is agreed upon by the greatest number of classifier models is selected as the final classification result for an API parameter.

In one or more embodiments, prior to training of the set of machine learning classifier models, a vectorization operation may be performed on the annotated training dataset, which may be followed by a Term Frequency-Inverse Document Frequency (TF-IDF) operation on the vectorized training dataset (or a dataset of word vectors). For example, the vectorization operation on the annotated training dataset may produce a dataset of word vectors (or word embeddings) which may be vectors of real numbers that are mapped to words or phrases in the annotated training dataset. The vectorization operation may be performed via a suitable word embedding method, such as neural networks (e.g., word2vec), dimensionality reduction on word co-occurrence matrix, probabilistic models, or explainable knowledge-based method. Similarly, the TF-IDF operation on the vectorized training dataset may be used to apply a weighing factor on every word vector in the vectorized dataset. The weighing factor may be later used to imply an importance of a word vector in the classification of an associated API parameter.

At 508, the trained set of machine learning classifier models may be evaluated on the annotated training dataset based on a k-fold (e.g., 5-fold stratified) cross validation of outputs of the trained set of machine learning classifier models. In at least one embodiment, the processor 202 may evaluate the trained set of machine learning classifier models on the annotated training dataset. Here, k-fold cross validation may be used to evaluate classification accuracy of the trained set of machine learning classifier models on unseen data. By way of example, the annotated training dataset may be shuffled and divided into k-groups. Of the k-groups, the set of machine learning classifier models may be trained on (k−1) groups and remaining 1 group may be the unseen dataset on which the trained set of machine learning classifier models may be evaluated.

At 510, an evaluation-metric ($S$) may be computed for each classifier model of the evaluated set of machine learning classifier models. In at least one embodiment, the processor 202 may compute the evaluation-metric ($S$) for each classifier model of the evaluated set of machine learning classifier models. For example, for 5 test inputs from the unseen dataset, each classifier model (Ci) may give (Xi) number of correct classification results and (Yi) number of incorrect classification results, where, "i" may denote a unique identifier for the classifier model. These numbers may be used to compute the evaluation-metric ($S$) as the number of correct classifications or the number of incorrect classifications.

At 512, the evaluated set of machine learning classifier models for which the computed evaluation-metric ($S$) is greater than a threshold ($\delta$) may be stored in the memory 204. In at least one embodiment, the processor 202 may store, in the memory 204, the evaluated set of machine learning classifier models for which the computed evaluation-metric ($S$) is greater than the threshold ($\delta$). These stored classifier models may then be later reused on a live dataset, as described herein.

At 514, a live dataset may be constructed based on the extracted metadata information. The live dataset may include metadata associated with the API parameter set. In at least one embodiment, the processor 202 may construct the live dataset based on the extracted metadata information (e.g., at 302). Herein, the API parameter set may be associated with one or more APIs or API endpoints which are a part of incoming data from a live production/usage environment. This live dataset may include unseen data related to the API parameter set for which API parameter classification is needed. Similar to the vectorized training dataset (at 506), the live dataset may also include word vectors (or weighted word vectors (after TF-IDF) which represent word tokens/n-grams extracted from parameter name(s) and/or description text associated with the API parameter set.

At 516, each API parameter of the API parameter set may be classified into an API parameter type based on application of the stored set of machine learning classifier models on the live dataset. In at least one embodiment, the processor 202 may classify each API parameter of the API parameter set into an API parameter type based on the application of the stored set of machine learning classifier models on the live dataset. By way of example, and not limitation, all the 3 pre-trained classifiers (Naïve Bayes classifier, SVM classifier, and LR classifier) may be applied on the live dataset to identify the API parameter type associated with each API parameter of the API parameter set. Herein, the API parameter type may be different from parameter 'format' type (i.e., query type, path type, etc.) or the parameter data type (i.e., String). For example, the API parameter type may classify individual API parameters based on whether an API parameter supports automatic parameter resolution or if it requires human inputs (such as for ID type or Password type parameters). Herein, the automatic parameter resolution may relate to API parameters whose sample parameter values may be extracted from publicly available sources (e.g., from the knowledge base server 108), without little or no human inputs.

Although the flowchart 500 is illustrated as discrete operations, such as 502, 504, 506, 508, 510, 512, 514, and 516, however, in certain embodiments, such discrete operations may be further divided into additional operations, combined into fewer operations, or eliminated, depending on the particular implementation without detracting from the essence of the disclosed embodiments.

Figure 6:
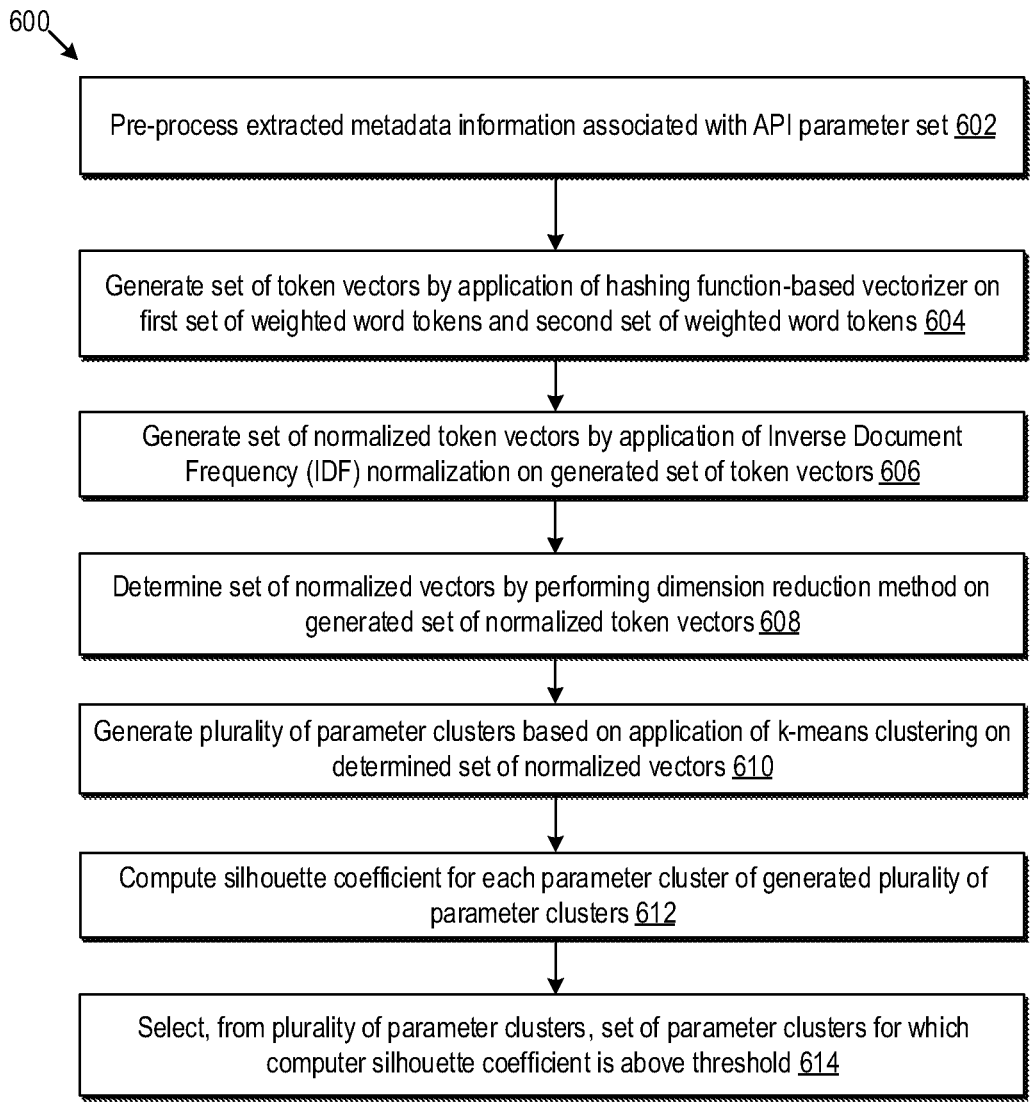
FIG. 6 illustrates a flowchart of an example method of generation of parameter clusters based on metadata information associated with API parameters.

FIG. 6 illustrates a flowchart of an example method of generation of parameter clusters based on metadata information associated with API parameters, arranged in accordance with at least one embodiment described in the present disclosure. With reference to FIG. 6, there is shown a flowchart 600. The method illustrated in the flowchart 600 may start at 602 and may be performed by any suitable system, apparatus, or device, such as by the system 102 of FIG. 1 or FIG. 2. Although illustrated with discrete blocks, the steps and operations associated with one or more of the blocks of the flowchart 600 may be divided into additional blocks, combined into fewer blocks, or eliminated, depending on the particular implementation.

At 602, the extracted metadata information associated with the API parameter set may be pre-processed. In at least one embodiment, the processor 202 may pre-process the extracted metadata information associated with the API parameter set. The pre-processing may include selection of a text description associated with each API parameter of the API parameter set from the extracted metadata information and tokenization of the selected text description associated with each API parameter of the API parameter set to generate a first set of word tokens. For example, a description text may be given as "Retrieve nearest airports by geo coordinates". The description text may be tokenized to include word tokens, given as follows: ["Retrieve", "nearest", "airports", "by", "geo", "coordinates"]. The pre-processing may further include lemmatization of the generated first set of word tokens and removal of stop words from the lemmatized first set of word tokens. Continuing with the above example, the word tokens may be lemmatized as ["retrieve", "near", "airport", "by" "geo", "coordinate"]. Lemmatization may return a set of lemmatized word tokens in a base form or a dictionary form of each word token. After the lemmatization, stop words, such as "by" may be removed to obtain a final first set of word tokens ["retrieve", "near", "airport", "geo", "coordinate"]. Examples of the stop words may include, but are not limited to, articles (such as, 'a', 'an', and 'the') and certain commonly occurring verbs (such as, "be").

The pre-processing may further include a selection of a parameter name (also referred to as a name token) associated with each API parameter of the API parameter set from the extracted metadata information and a split of the selected parameter name into a second set of word tokens. For example, a parameter with name "CountryCode" may have a name token as "CountryCode". The processor 202 may split the name token to two word tokens, i.e. "Country" and "Code". The pre-processing may further include an assignment of a first set of weights to the first set of word tokens and a second set of weights to the second set of word tokens to obtain a first set of weighted word tokens and a second set of weighted word tokens, respectively. For example, a higher weight may be assigned to a word token associated with the parameter name than that for a word token associated with the parameter description.

At 604, a set of token vectors may be generated by application of a hashing function-based vectorizer on the first set of weighted word tokens and the second set of weighted word tokens. In at least one embodiment, the processor 202 may generate the set of token vectors by application of the hashing function-based vectorizer on the first set of weighted word tokens and the second set of weighted word tokens. By way of example, the generation of the set of token vectors may be a part of a feature extraction operation performed after metadata information is pre-processed. For instance, the processor 202 may implement a sparse vectorizer, i.e. the hashing function-based vectorizer to apply a hash function to term frequency (TF) counts of the first set of weighted word tokens and the second set of weighted word tokens (hereinafter, referred to as weighted tokens). As TF of the weighted tokens may generate a large vocabulary of terms that may require lengthy vectors, the use of the hashing function-based vectorizer may reduce the vector length and may make computational operations associated with the set of set of token vectors as computationally less expensive.

At 606, a set of normalized token vectors (also referred to as TF-IDF vectors) may be generated by application of Inverse Document Frequency (IDF) normalization on the generated set of token vectors. In at least one embodiment, the processor 202 may apply the IDF normalization on the output (i.e. the generated set of token vectors) of the hashing function-based vectorizer to normalize the output of the hashing function-based vectorizer.

At 608, a set of normalized vectors may be determined by performing a dimension reduction method on the generated set of normalized token vectors. In at least one embodiment, the processor 202 may determine the set of normalized vectors by performing the dimension reduction method on the generated set of normalized token vectors. For example, the dimensionality reduction method may include a latent semantic analysis (LSA) method which corresponds to application of a singular value decomposition (SVD) on the generated set of normalized token vectors.

Typically, the LSA method is used to analyze relationships between a document and terms included in the document to produce concepts related to the document and to the terms. The LSA method may represent the document as a "bag of words" based on a frequency of occurrence of the words in the document. LSA models may represent concepts as words that occur in a certain pattern together, and thereby may be indicative of a certain meaning for the concept. As an example, occurrence of words, such as "mortgage", "loan", or "insurance" in a close proximity to a word "bank" may indicate that the word "bank" refers to a "financial institution". As another example, when words "lure", "fishing", or "casting" occur close to the word "bank", the context may be of a "river bank".

In at least one embodiment, to apply the dimensionality reduction method, the processor 202 apply a truncated SVD on TF-IDF vectors (i.e. the generated set of normalized token vectors). The SVD method may be used to factorize a matrix M (represents a normalized token vector from 606) into three matrices M=U*S*V, where S may correspond to a diagonal matrix of the singular values of the matrix M. The truncated SVD may reduce the dimensionality of the matrix M based on a selection of only 't' largest singular values from the matrix S and keeping only first 't' columns of U and V. Here, 't' may correspond to a hyper-parameter that may be selectable and adjustable to indicate a desired number of topics. The dimensionally reduced matrix 'A' may be represented by equation (1), as follows:

$$A \approx U_t S_t V_t^T \qquad (1)$$

In the equation (1) above, $U \in \mathbb{R}^{\wedge}(m \times t)$ may correspond to a document-topic matrix and $V \in \mathbb{R}^{\wedge}(n \times t)$ may correspond to a term-topic matrix. The columns of each of the matrices U and V may correspond to one of a 't' topics. Further, in the matrix U, rows may correspond to document vectors based on topics, while in the matrix V, rows may correspond to term vectors based on topics. Herein, the matrix 'A' may represent a normalized vector obtained after the application of truncated SVD on a normalized token vector (from 606).

At 610, a plurality of parameter clusters may be generated based on application of k-means clustering on the determined set of normalized vectors (from 608). In at least one embodiment, the processor 202 may generate the plurality of parameter clusters based on the application of k-means clustering on the determined set of normalized vectors.

By way of example, and not limitation, k-means clustering may be used to cluster 'N' objects (e.g., 'N' normalized vectors) into 'k' ('k'<'N') partitions or clusters based on centroids computed from data points (i.e., normalized vectors, $\vec{x} \in C$) in a cluster c, which may be computed using equation (2), as follows $$\vec{\mu}(c) = \frac{1}{|c|} \sum_{\vec{x} \in C} \vec{x} \quad (2)$$

where, 'C' may correspond to a set of all data points (all normalized vectors) in the cluster 'c' from the set of normalized vectors; and
|c| may correspond to a number of data points (normalized vectors) in the cluster 'c'.

The processor 202 may group the datapoints in a cluster (c) based on minimization of sum of squares of distances between the datapoints and the corresponding centroid of the cluster (c). For example, the k-means clustering technique may begin with 'K' clusters. At an initial iteration, the processor 202 may select first 'k' training samples from the set of normalized vectors as single element clusters. Thereafter, the processor 202 may assign each of remaining N-k training samples (if there are 'N' total number of normalized vectors) to a cluster, from the 'K' clusters, with a nearest centroid. The processor 202 may re-compute a centroid of the cluster to which the N-k training samples are assigned. For each training sample, the processor 202 may compute a distance with a centroid of each cluster of the "K" clusters. If a training sample is not currently in the cluster with a nearest centroid, the processor 202 may re-assign the sample to the cluster with the nearest centroid and update centroids of the cluster gaining the training sample and the cluster losing the training sample. The processor 202 may iterate the k-means clustering method until no new re-assignments of training samples take place.

At 612, a silhouette coefficient may be computed for each parameter cluster of the generated plurality of parameter clusters. In at least one embodiment, the processor 202 may compute the silhouette coefficient for each parameter cluster of the generated plurality of parameter clusters. For a parameter cluster (c), the silhouette coefficient may rely on two measures, i.e. cohesion and separation. While the cohesion may measure how objects (i.e. normalized vectors) are closely related in a parameter cluster, the separation may measure how distinct or well-separated a parameter cluster is from other parameter clusters of the plurality of parameter clusters.

By way of example, for each parameter cluster, the processor 202 may compute a silhouette (s(x)), using equation (3), as follows:

$$s(x) = \frac{b(x) - a(x)}{\max\{a(x), b(x)\}} \quad (3)$$

where,
a(x) corresponds to cohesion or average distance of a normalized vector 'x' from other normalized vectors in the same cluster, and
b(x) corresponds to separation or average distance of a normalized vector 'x' from other normalized vectors in the other clusters.

Using equation (3), the silhouette coefficient may be computed using equation (4), as follows:

$$\text{Silhouette Coefficient } (SC) = \frac{1}{N} \sum_{i=1}^{N} s(x) \quad (4)$$

At 614, from the plurality of parameter clusters, a set of parameter clusters may be selected for which the computed silhouette coefficient is above a threshold. In at least one embodiment, the processor 202 may select, from the plurality of parameter clusters, the set of parameter clusters for which the computer silhouette coefficient is above a threshold. Typically, the silhouette coefficient (SC) lies between 0 and 1 and a value of the silhouette coefficient that is closer to "1" indicates a better parameter cluster. By way of example, and not limitation, each parameter cluster of the set of parameter clusters may include a group of word tokens associated with one or more API parameters of the API parameters set. An example of a parameter cluster is provided in Table 1, as follows:

TABLE 1

Example of a parameter cluster

| Parameter Name | Parameter Description | Count |
|---|---|---|
| state | | 29 |
| state | A two-letter state code. Example: CA, IL, etc. | 4 |
| state | The nearest state or province to the venue | 3 |
| state | Return opened, closed, or all issues | 3 |
| recipient_state | State of recipient | 3 |
| state | Matches against published state of the spec | 3 |
| state | Filter users by State | 2 |
| status | The state of the subscription active | 2 |
| state | The state or province for the subscriber | 2 |
| state | String to filter by state | 2 |
| state | US state or territory | 2 |
| state | The state field only applies to election dates and reporting deadlines, reporting periods and all other dates do not have the array of states to filter on | 2 |
| state | Filter state by specified value | 2 |
| state | Primary state of the organization | 2 |
| state_code | Location state code | 2 |
| state | Account state | 1 |
| billing_address_state | Billing address state | 1 |
| state | State of the invoice to set. Only cancel value is allowed | 1 |
| state | Only return pull requests that in this state. This parameter can be repeater | 1 |
| category | The type of object. You can specify "component", "log", "state", and "alarm". The default is "state". | 1 |

The example illustrated in Table 1 comprises the parameter names, their respective descriptions, and associated occurrences (count). These parameter names and their respective descriptions include word tokens whose normalized vector representations are clustered at 610 as a parameter cluster. It should be noted here that data provided in Table 1 should be merely be taken as example data and should not be construed as limiting for the present disclosure.

Although the flowchart 600 is illustrated as discrete operations, such as 602, 604, 606, 608, 610, 612, and 614, however, in certain embodiments, such discrete operations may be further divided into additional operations, combined into fewer operations, or eliminated, depending on the particular implementation without detracting from the essence of the disclosed embodiments.

Figure 7:
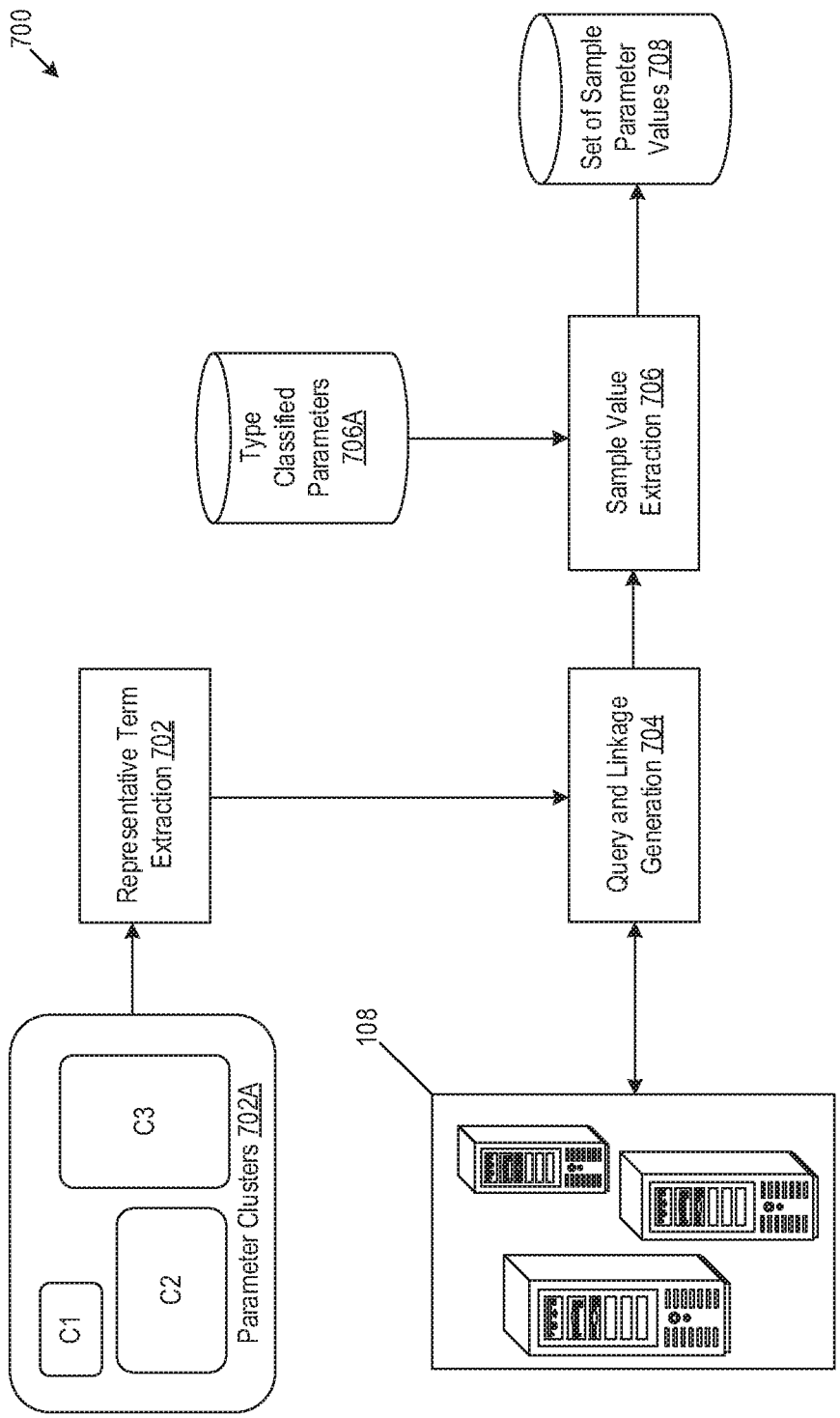
FIG. 7 is a diagram that illustrates exemplary operations of sample value extraction based on parameter clusters of FIG. 6.

FIG. 7 is a diagram that illustrates exemplary operations of sample value extraction based on parameter clusters of FIG. 6, arranged in accordance with at least one embodiment described in the present disclosure. With reference to FIG. 7, there is shown a diagram 700. Exemplary operations illustrated in the diagram 700 may start at 702 and may be performed by any suitable system, apparatus, or device, such as by the system 102 of FIG. 1 or FIG. 2.

At 702, representative term determination may be performed. In the representation term extraction, a representative term may be determined for each parameter cluster of a set of parameter clusters 702A (e.g., the set of parameter clusters obtained at 614 of FIG. 6). In at least one embodiment, the processor 202 may extract, from each parameter cluster of the set of parameter clusters 702A, a first set of terms that correspond to centroids of the corresponding parameter cluster. Additionally, from the extracted metadata information, the processor 202 may extract a set of key-phrases associated with at least one of parameter names or descriptions of the API parameter set. Thereafter, based on the extracted set of terms and the extracted set of key-phrases, the processor 202 may determine the representative term for each parameter cluster of the set of parameter clusters 702A. For instance, the representative term may be one which occurs the most in both sets (i.e. the extracted set of terms and the extracted set of key-phrases).

By way of example, and not limitation, a set of terms associated with centroids of a parameter cluster may be extracted. The set of terms may be a representative of the top-N centroids of the parameter cluster. Before extraction of the set of terms, all terms in the parameter cluster may be ranked based on k-means technique. All the terms may be re-ranked based on occurrence of terms in the parameter description associated with the parameter cluster. Alternatively stated, terms that appear in the parameter description may be ranked higher than other terms, which may lead to a better ranking of centroid terms. Additionally, or alternatively, a set of key-phrases associated with at least one of the parameter name or the parameter description may be extracted. For example, phrases from the name or descriptions of one or more API parameters may be tokenized and part-of-speech (POS) tagging may be performed on the tokenized phrases. Further, a grammatical analysis of the tokenized phrases may be performed to finally extract the set of key-phrases. The set of key phrases may be further ranked based on the TF-IDF method. The representative term may be determined from the extracted set of terms and the set of key-phrases.

As an example, Table 2 provides an example of a set of terms related to centroids of an example parameter cluster and a set of key-phrases (bi-grams) extracted from parameter description of API parameters related to the example parameter cluster.

TABLE 2

Centroid terms and key-phrases of an example parameter cluster

Centroids: ['state', 'specified', 'specified value', 'value', 'filter', 'filter state', 'status', 'return', 'active', 'recipient', 'closed', 'default', 'parameter', 'office', 'open', 'issues', 'runner', 'set', 'pull', 'repeated']
Key-Phrases: ['state state', 'state code', 'state filter', 'state return', 'state province', 'state twoletter', 'twoletter state', 'code example', 'example ca', 'ca il', 'filter state', 'state nearest', 'nearest state', 'province venue', 'return opened', 'opened closed', 'closed issue', 'state specified', 'u state', 'state u', 'recipient_state state', 'state recipient', 'state territory', 'state match', 'match published', 'published state', 'state spec', 'filter user', 'user state', 'state parameter']

With reference to Table 2, terms that appear most frequently in both centroid set and key-phrases set may be considered for the representative term.

At 704, a query and linkage generation may be performed. In the query and linkage generation, a query may be provided to the knowledge base server 108 and a result may be received from the knowledge base server 108 based on the provided query. The query may include the determined representative term associated with one of the set of parameter clusters 702A. In at least one embodiment, the processor 202 may provide the query to the knowledge base server 108 and may receive, from the knowledge base server 108, the result based on the provided query. The result may include a plurality of sample parameter values associated with the one or more API parameters.

By way of example, and not limitation, the knowledge base server 108 may be implemented as a WikiData knowledge repository which may be accessible through a MediaWiki API by use of a SparkSQL query language. In case the determined representative term for a parameter cluster (c) is 'city' (e.g., the cluster centroid as the term 'city'), the processor 202 may search the keyword 'city' from the MediaWiki API to obtain an entity "Q515", which may correspond to the keyword 'city' in the WikiData knowledge repository. Thereafter, the processor 202 may automatically generate a query (i.e. an SQL query) as follows:

SELECT ?item ?itemLabel WHERE {?item wdt:P31/wdt:P279 wd:Q515.} LIMIT 20

In the query, "wdt:P31/wdt:P279" may be associated with the extraction of an instance or a sub-class of the queried entity (i.e., Q515; or 'city' in the above case). When provided to the knowledge base server 108, the query may return a list of at most 20 cities. For example, in the above case, the query may return a set of cities (at most 20 in number) in a certain format, such as, a two letter format. In such a case, the set of results received from the knowledge base server 108 may include 'SJ' for 'San Jose', 'NY' for 'New York', 'PH' for 'Philadelphia', and the like.

At 706, a sample value extraction may be performed. In the sample value extraction, a set of sample parameter values 708 may be extracted from the plurality of sample parameter values (obtained at 704) by filtering the result using an API parameter type associated with the one or more API parameters. In at least one embodiment, the processor 202 may extract the set of sample parameter values 708 from the plurality of sample parameter values. For example, each API parameter of the API parameter set may be classified into an API parameter type (as explained in FIG. 5) and may be stored as type-classified parameters 706A. Information related to the one or more API parameters from the type-classified parameters 706A may be retrieved. Such information may be used to filter the result and extract the set of sample parameter values 708. By filtering, it may be ensured that only valid sample parameter values are selected and other sample values, i.e. outliers, are filtered out. The extracted set of sample parameter values 708 may be reliable for testing API endpoints having API parameters which require such sample parameter values.

Although the diagram 700 is illustrated as discrete operations, such as 702, 704, and 706, however, in certain embodiments, such discrete operations may be further divided into additional operations, combined into fewer operations, or eliminated, depending on the particular implementation without detracting from the essence of the disclosed embodiments.

Figure 8:
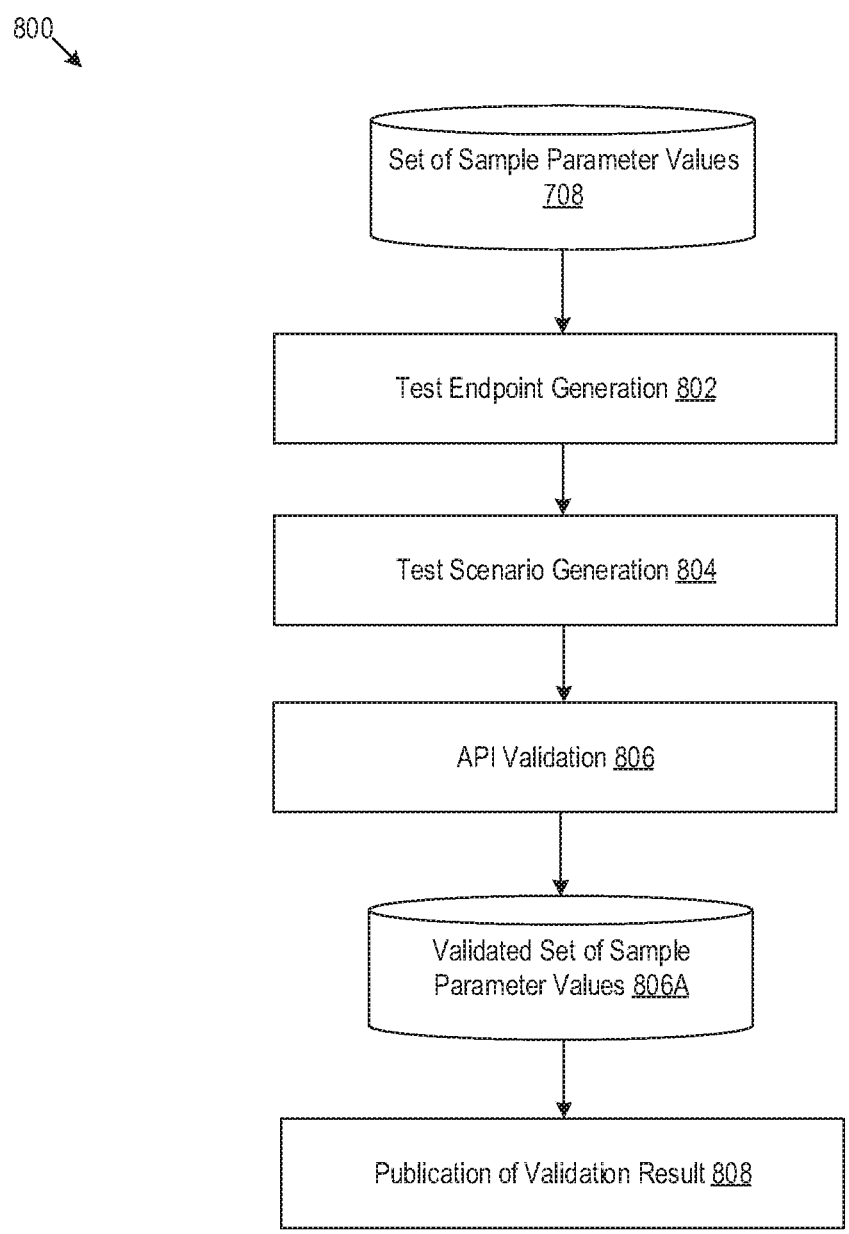
FIG. 8 is a diagram that illustrates exemplary operations of API validation based on sample values of FIG. 7, all according to at least one embodiment described in the present disclosure.

FIG. 8 is a diagram that illustrates exemplary operations of API validation based on sample values of FIG. 7, arranged in accordance with at least one embodiment described in the present disclosure. With reference to FIG. 8, there is shown a diagram 800. Exemplary operations illustrated in the diagram 800 may start at 802 and may be performed by any suitable system, apparatus, or device, such as by the system 102 of FIG. 1 or FIG. 2.

At 802, a test endpoint generation may be performed. In the test endpoint generation, a set of test API endpoints associated with the one or more APIs may be generated based on the extracted set of sample parameter values 708. In at least one embodiment, the processor 202 may generate the set of test API endpoints associated with the one or more APIs based on the extracted set of sample parameter values 708.

By way of example, there may be three parameter clusters (e.g., clusters c1, c2, and c3 (as shown in FIG. 7). Each parameter cluster may include one or more API parameters from the API parameter set. Each of the parameter cluster c1 and parameter cluster c2 may include a path type parameter, denoted as param-1 and param-2, respectively. Further, the parameter cluster c3 may include a query type parameter, denoted as param-3. An example representation of a test API endpoint is given by an expression (5), as follows:

$$[EL]/\{param\text{-}1\}/[EL]/\{param\text{-}2\}?\{param\text{-}3\} \quad (5)$$

where EL may correspond to an Endpoint Literal associated with an API endpoint.

The processor 202 may generate a set of test API endpoints using the expression (5), based on the extracted sample parameter values for the parameters param-1, param-2, and param-3, which may be represented as $A_x$, $B_y$, and $C_z$, respectively. Another example representation of a test API endpoint is given by an expression (6), as follows:

$$[EL]/A_1/[EL]/B_1?param\text{-}3 = C_1 \quad (6)$$

where, $A_x$ may denote x candidate sample parameter values for param-1 in cluster c1, $B_y$ may denote y candidate sample parameter values for param-2 in cluster c2, and $C_z$ may denote z candidate sample parameter values for param-3 in cluster c3.

At 804, a test scenario generation may be performed. In test scenario generation, the generated set of test API endpoints may be sorted based on execution constraints associated the one or more APIs and the sorted set of test API endpoints may be executed as a sequence of API calls to an API provider of the one or more APIs. In at least one embodiment, the processor 202 may sort the generated set of test API endpoints and execute the sorted set of test API endpoints as a sequence of API calls to the API provider of the one or more APIs.

Typically, there are two execution constraints associated the one or more APIs. While first execution constraint sets a time complexity of trying out all possible combination of the extracted set of sample parameter values 708, second execution constraint sets a maximum hit rate (e.g., a cap on number of API calls for an API endpoint per time-step). The second execution constraint is relevant as a significant number of native API calls for a particular API endpoint may create false alarms on servers of the API provider. As a result, the API provide may block all subsequent API calls for that particular API endpoint when the maximum hit rate is achieved. A solution to the first execution constraint may be to include a policy to divide the set of test API endpoints into different groups and run multiple groups in parallel. A solution to the second execution constraint may be to include a shuffling (or sorting) policy while executing the set of test API endpoints. By way of example, the generated set of test API endpoints may be shuffled (or sorted) in an order (e.g., a random order). The shuffled set of test API endpoints may be executed as a sequence of API calls to the API provider so as to prevent the API provider from falsely blocking the API calls as a potential denial of a request from a valid user/authorized user. An example of a set of test API endpoints and a shuffled set of test API endpoints is provided in Table 3, as follows:

TABLE 3

Example of a set of test API endpoints and a shuffled set of test API endpoints

| Set of Test API Endpoints | Shuffled Set of Test API Endpoints |
|---|---|
| [EL1]/$A_1$/[EL1]/$B_1$?param3 = $C_1$ | [EL2]/$D_1$/[EL2]/$E_1$ |
| ... | [EL4]/$H_3$?param8 = $K_1$ |
| [EL1]/$A_X$/[EL1]/$B_Y$?param3 = $C_Z$ | [EL1]/$A_1$/[EL1]/$B_1$?param3 = $C_1$ |
| [EL2]/$D_1$/[EL2]/$E_1$ | ... |
| ... | [EL2]/$D_J$/[EL2]/$E_J$ |
| [EL2]/$D_J$/[EL2]/$E_J$ | ... |
| ... | |

With reference to Table 3, in first column, all test API endpoints for $EL_1$, $EL_2$ ... $EL_N$ are arranged in a sequence. By application of the shuffling policy, all the test API endpoints for $EL_1$, $EL_2$ ... $EL_N$ are shuffled in a random order.

At 806, API validation may be performed. In API validation, the extracted set of sample parameter values 708 may be validated based on execution of the generated set of test API endpoints. In at least one embodiment, the processor 202 may validate the extracted set of sample parameter values 708 based on results returned for the sequence of API calls.

For example, for each test API endpoint, if the result includes a defined output as defined for the API endpoint in the API specification document, the respective sample parameter value(s) may be validated. Otherwise, if the result indicates a deviation from the defined output, the respective sample parameter value(s) may be invalidated. After the validation, a validated set of sample parameter values 806A may be obtained and the validated set of sample parameter values 806A may be stored in the memory 204. For example, in case a certain sample parameter value (e.g., a two character city code, such as, 'NY' for 'New York') produces a valid output based on the execution of an API call with the sample parameter value, the sample parameter value may be determined as valid.

At 808, a publication of a validation result may be performed. In at least one embodiment, the processor 202 may publish, based on the validation, a validation result as an indicator for suitability of the one or more APIs for a software application. For example, the validation result may be published on the display of the user-end device 106 and may include the validated set of sample parameter values 806A and the results obtained for the execution of the set of test API endpoints using the extracted set of sample parameter values 708. In some instances, the user 112 may intend to include a suitable API/API endpoint for the software application that is under development. As the validation result is for the one or more API whose API endpoints were tested, the user 112 may be able to decide whether or not to include the API endpoints or the one or more APIs in the software application. The user 112 may not be required to read documentations to manually generate the sample parameter values and test out the sample parameter values individually by coding and executing test API endpoints. This may also save user's time and speed up the software development process.

An exemplary embodiment of intra-cluster parameter resolution is provided herein. The processor 202 may determine a group of API endpoints having a group of API parameters for which sample parameter values are undetermined. The processor 202 may resolve an indetermination of the sample parameter values by selecting at least one sample parameter value from the validated set of sample parameter values 806A as the sample parameter values of the group of API parameters. As an example, for the "city" as the representative terms, validated sample parameter values may be obtained as "CA", "IL", "AZ", and "CO". Such sample parameter values may be also tested (or used) for API parameters for which sample parameter values are undetermined.

Although the diagram 800 is illustrated as discrete operations, such as 802, 804, 806, and 808, however, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as the system 102) to perform operations. The operations may include extracting, from an API repository (such as the API repository 104 of FIG. 1), metadata information associated with an API parameter set of at least one API and generating a set of parameter clusters associated with the API parameter set based on the extracted metadata information. Each parameter cluster of the set of parameter clusters may include a group of word tokens associated with at least one API parameter of the API parameters set. The operations may further include determining a representative term for each parameter cluster of the generated set of parameter clusters and extracting, from a knowledge base server (such as the knowledge base server 108 of FIG. 1), a set of sample parameter values based on the determined representative term. The operations may further include generating a set of test API endpoints associated with the at least one API based on the extracted set of sample parameter values, validating the extracted set of sample parameter values by executing the generated set of test API endpoints, and publishing, based on the validation, a validation result as an indicator for suitability of the at least one API for a software application.

As indicated above, the embodiments described in the present disclosure may include the use of a special purpose or general purpose computer (e.g., the processor 202 of FIG. 2) including various computer hardware or software modules, as discussed in greater detail below. Further, as indicated above, embodiments described in the present disclosure may be implemented using computer-readable media (e.g., the memory 204 or the persistent data storage 206 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    extracting, from an application programming interface (API) repository, metadata information associated with an API parameter set of at least one API;
    generating a set of parameter clusters associated with the API parameter set based on the extracted metadata information,
        wherein each parameter cluster of the set of parameter clusters comprises a group of word tokens associated with at least one API parameter of the API parameters set;
    extracting, from each parameter cluster of the set of parameter clusters, a set of terms that correspond to centroids of the corresponding parameter cluster;
    extracting a set of key-phrases associated with at least one of parameter names or descriptions of the API parameter set from the extracted metadata information;
    determining a representative term for each parameter cluster of the generated set of parameter clusters based on the extracted set of terms and the extracted set of key-phrases;
    extracting, from a knowledge base server, a set of sample parameter values based on the determined representative term;
    generating a set of test API endpoints associated with the at least one API based on the extracted set of sample parameter values;
    validating the extracted set of sample parameter values by executing the generated set of test API endpoints; and
    publishing, based on the validation, a validation result as an indicator for suitability of the at least one API for a software application.

2. The method according to claim 1, wherein the extracted metadata information comprises at least one of an API title, an API host address, an API base path, an API endpoint, an HTTP method, an API parameter type, or an API parameter description.

3. The method according to claim 1, further comprising storing, in memory, a set of machine learning classifier models pre-trained for a parameter type classification task.

4. The method according to claim 3, wherein the set of machine learning classifier models comprises a Nave Bayes classification classifier, a Support Vector Machine (SVM) classifier, and a Logistic Regression (LR) classifier.

5. The method according to claim 3, further comprising:
    constructing, based on the extracted metadata information, a live dataset comprising metadata associated with the API parameter set; and
    classifying each API parameter of the API parameter set into an API parameter type based on application of the stored set of machine learning classifier models on the live dataset.

6. The method according to claim 1, further comprising pre-processing the extracted metadata information associated with the API parameter set, wherein the pre-processing comprises:
    selecting, from the extracted metadata information, a text description associated with each API parameter of the API parameter set;
    tokenizing the selected text description associated with each API parameter of the API parameter set to generate a first set of word tokens;
    lemmatizing the generated first set of word tokens;
    removing stop words from the lemmatized first set of word tokens;
    selecting, from the extracted metadata information, a parameter name associated with each API parameter of the API parameter set;
    splitting the selected parameter name associated with each API parameter of the API parameter set into a second set of word tokens; and
    assigning a first set of weights to the first set of word tokens and a second set of weights to the second set of word tokens to obtain a first set of weighted word tokens and a second set of weighted word tokens.

7. The method according to claim 6, further comprising:
    generating a set of token vectors by application of a hashing function-based vectorizer on the first set of weighted word tokens and the second set of weighted word tokens; and generating a set of normalized token vectors by application of a Term Frequency-Inverse Document Frequency (TF-IDF) method on the generated set of token vectors.

8. The method according to claim 7, further comprising determining a set of normalized vectors by performing a dimensionality reduction method on the generated set of normalized token vectors,
wherein the dimensionality reduction method comprises a latent semantic analysis (LSA) method which corresponds to application of a singular value decomposition (SVD) on the generated set of normalized token vectors.

9. The method according to claim 8, further comprising generating a plurality of parameter clusters based on application of k-means clustering on the determined set of normalized vectors.

10. The method according to claim 9, further comprising:
computing a silhouette coefficient for each parameter cluster of the generated plurality of parameter clusters; and
selecting, from the generated plurality of parameter clusters, the set of parameter clusters for which the computed silhouette coefficient is above a threshold.

11. The method according to claim 1, further comprising:
providing, to the knowledge base server, a query comprising the determined representative term associated with one of the set of parameter clusters;
receiving, from the knowledge base server, a result comprising a plurality of sample parameter values associated with the at least one API parameter, based on the provided query; and
extracting the set of sample parameter values from the plurality of sample parameter values by filtering the result using an API parameter type associated with the at least one API parameter.

12. The method according to claim 1, further comprising:
sorting the generated set of test API endpoints based on execution constraints associated with the at least one API;
executing the sorted set of test API endpoints as a sequence of API calls to an API provider of the at least one API; and
validating the extracted set of sample parameter values based on results returned for the sequence of API calls.

13. The method according to claim 1, further comprising:
determining a group of API endpoints having a group of API parameters for which sample parameter values are undetermined; and
resolving an indetermination of the sample parameter values by selecting at least one sample parameter value of the validated set of sample parameter values as the sample parameter values of the group of API parameters.

14. One or more non-transitory computer-readable storage media configured to store instructions that, in response to being executed, cause an electronic device to perform operations, the operations comprising:
extracting, from an application programming interface (API) repository, metadata information associated with an API parameter set of at least one API;
generating a set of parameter clusters associated with the API parameter set based on the extracted metadata information,
wherein each parameter cluster of the set of parameter clusters comprises a group of word tokens associated with at least one API parameter of the API parameters set;
extracting, from each parameter cluster of the set of parameter clusters, a set of terms that correspond to centroids of the corresponding parameter cluster;
determining a representative term for each parameter cluster of the generated set of parameter clusters based at least on the extracted set of terms;
extracting, from a knowledge base server, a set of sample parameter values based on the determined representative term;
generating a set of test API endpoints associated with the at least one API based on the extracted set of sample parameter values;
validating the extracted set of sample parameter values by executing the generated set of test API endpoints; and
publishing, based on the validation, a validation result as an indicator for suitability of the at least one API for a software application.

15. The one or more non-transitory computer-readable storage media according to claim 14, further comprising:
extracting a set of key-phrases associated with at least one of parameter names or descriptions of the API parameter set from the extracted metadata information; and
determining the representative term for each parameter cluster of the set of parameter clusters based further on the extracted set of key-phrases.

16. The one or more non-transitory computer-readable storage media according to claim 14, further comprising:
providing, to the knowledge base server, a query comprising the determined representative term associated with one of the set of parameter clusters;
receiving, from the knowledge base server, a result comprising a plurality of sample parameter values associated with the at least one API parameter, based on the provided query; and
extracting the set of sample parameter values from the plurality of sample parameter values by filtering the result using an API parameter type associated with the at least one API parameter.

17. A system, comprising:
circuitry configured to:
extract, from an application programming interface (API) repository, metadata information associated with an API parameter set of at least one API;
generate a set of parameter clusters associated with the API parameter set based on the extracted metadata information,
wherein each parameter cluster of the set of parameter clusters comprises a group of word tokens associated with at least one API parameter of the API parameters set;
extracting, from each parameter cluster of the set of parameter clusters, a set of terms that correspond to centroids of the each parameter cluster;
determine a representative term for each parameter cluster of the generated set of parameter clusters based at least on the extracted set of terms;
extract, from a knowledge base server, a set of sample parameter values based on the determined representative term;
generate a set of test API endpoints associated with the at least one API based on the extracted set of sample parameter values;
validate the extracted set of sample parameter values by executing the generated set of test API endpoints; and publish, based on the validation, a validation result as an indicator for suitability of the at least one API for a software application.

18. The system according to claim 17, wherein the circuitry is further configured to:
   extract a set of key-phrases associated with at least one of parameter names or descriptions of the API parameter set from the extracted metadata information; and
   determine the representative term for each parameter cluster of the set of parameter clusters based further on the extracted set of key-phrases.

19. The system according to claim 17, wherein the circuitry is further configured to:
   provide, to the knowledge base server, a query comprising the determined representative term associated with one of the set of parameter clusters;
   receive, from the knowledge base server, a result comprising a plurality of sample parameter values associated with the at least one API parameter, based on the provided query; and
   extract the set of sample parameter values from the plurality of sample parameter values by filtering the result using an API parameter type associated with the at least one API parameter.

* * * * *